United States Patent
Kim (10) Patent No.: US 11,892,595 B2
(45) Date of Patent: Feb. 6, 2024

(54) WINDOW FOR DISPLAY DEVICE AND METHOD OF MANUFACTURING THE SAME

(71) Applicant: Samsung Display Co., LTD., Yongin-si (KR)

(72) Inventor: Kang Yoon Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 374 days.

(21) Appl. No.: 17/139,282

(22) Filed: Dec. 31, 2020

(65) Prior Publication Data
US 2021/0208310 A1 Jul. 8, 2021

(30) Foreign Application Priority Data
Jan. 3, 2020 (KR) .......... 10-2020-0000752

(51) Int. Cl.
*G02B 1/14* (2015.01)
*G06F 1/16* (2006.01)
*B32B 37/00* (2006.01)

(52) U.S. Cl.
CPC .............. *G02B 1/14* (2015.01); *B32B 37/003* (2013.01); *G06F 1/1607* (2013.01); *B32B 2457/20* (2013.01)

(58) Field of Classification Search
CPC .......... G02B 1/14; G02B 1/10; B32B 37/003; B32B 2457/20; B32B 38/1866; B32B 38/145; G06F 1/1607; G06F 2200/1634; G06F 1/1626; G09F 9/00; G09F 9/301; G02F 1/133308; G02F 1/133331
See application file for complete search history.

(56) References Cited

U.S. PATENT DOCUMENTS

2017/0079150 A1* 3/2017 Do ........................... H05K 5/03
2017/0349473 A1* 12/2017 Moriya ............... C03B 23/0252
2020/0412855 A1* 12/2020 Bi ............................ B32B 7/022
2021/0387443 A1* 12/2021 Wang ................ B32B 17/10036

FOREIGN PATENT DOCUMENTS

| CH | 697569 B1 | * | 12/2008 |
| EP | 1136973 A1 | * | 9/2001 |
| JP | 2002326319 A | * | 11/2002 |
| KR | 1020190047971 | | 5/2019 |

OTHER PUBLICATIONS

JP2002326319A Machine Translation of Description (EPO/Google) (Year: 2023).*
CH697569B1 Machine Translation of Description (EPO/Google) (Year: 2023).*

* cited by examiner

*Primary Examiner* — Cynthia L Schaller
(74) *Attorney, Agent, or Firm* — CANTOR COLBURN LLP (57) ABSTRACT

A window for a display device includes a cover glass including a flat portion and a curved portion adjacent to the flat portion, a decorative film which is disposed on the cover glass and in which a plurality of holes overlapping the curved portion is defined, and a printing layer disposed on the decorative film and covering the plurality of holes.

20 Claims, 9 Drawing Sheets

WINDOW FOR DISPLAY DEVICE AND METHOD OF MANUFACTURING THE SAME

This application claims priority to Korean Patent Application No. 10-2020-0000752 filed on Jan. 3, 2020, and all the benefits accruing therefrom under 35 U.S.C. § 119, the content of which in its entirety is herein incorporated by reference.

BACKGROUND

1. Field

Embodiments relate to a display device. More particularly, embodiments relate to a window for a display device and a method of manufacturing the window.

2. Description of the Related Art

A display device may include a display panel for displaying an image and a window for protecting the display panel. The display panel may include various types such as an organic light emitting display panel, a liquid crystal display panel, a plasma display panel, or the like.

The window may include a cover glass for protecting the display panel from external impact and transmitting the image provided from the display panel and a functional film attached on the cover glass. The functional film may include, for example, a decorative film for providing aesthetic impression to a user and defining a display area of the window.

Recently, a flexible display device in which at least a portion of an edge of the display device is bent is being developed.

SUMMARY

A window of a flexible display device may have a structure in which at least a portion of an edge of the window is bent. When a functional film is attached to the window, the functional film may be detached from the window, and air bubbles may be generated between the window and the functional film.

Embodiments provide a window for a display device in which air bubbles are not generated between a cover glass having a curved portion and a decorative film.

Embodiments provide a method of manufacturing a window for a display device for attaching a decorative film to a cover glass having a curved portion without detachment.

A window for a display device in an embodiment includes a cover glass including a flat portion and a curved portion adjacent to the flat portion, a decorative film which is disposed on the cover glass and in which a plurality of holes overlapping the curved portion is defined, and a printing layer disposed on the decorative film and covering the plurality of holes.

In an embodiment, the curved portion may have multiple curvatures.

In an embodiment, a bent angle of the curved portion may be equal to or greater than about 70 degrees with respect to an imaginary straight line perpendicular to the flat portion.

In an embodiment, the curved portion may be positioned at a corner of the cover glass.

In an embodiment, the curved portion may be positioned at an edge of the cover glass.

In an embodiment, each of the plurality of holes may have a circular shape in a plan view.

In an embodiment, a diameter of each of the plurality of holes may be about 1 millimeter (mm).

In an embodiment, sizes of the plurality of holes may be substantially equal to each other.

In an embodiment, sizes of the plurality of holes may be different from each other.

In an embodiment, a distance between adjacent holes among the plurality of holes may be uniform.

In an embodiment, a distance between adjacent holes among the plurality of holes may be non-uniform.

In an embodiment, the printing layer may overlap the curved portion and does not overlap the flat portion.

In an embodiment, the printing layer may overlap the curved portion and the flat portion.

In an embodiment, a color of the printing layer may be substantially the same as a color of the decorative film.

In an embodiment, the printing layer may fill the plurality of holes.

A method of manufacturing a window for a display device in an embodiment includes defining a plurality of holes in a decorative film, attaching the decorative film to a cover glass including a flat portion and a curved portion such that the plurality of holes overlaps the curved portion, and forming a printing layer covering the plurality of holes on the decorative film.

In an embodiment, the plurality of holes may be defined by a laser cutting.

In an embodiment, the printing layer may be formed by a spray printing.

In an embodiment, the method may further include removing air bubbles between the cover glass and the decorative film after the attaching the decorative film and before the forming the printing layer.

In an embodiment, the air bubbles may be removed in an autoclave.

In the window for the display device in the embodiments, the decorative film may include the plurality of holes overlapping the curved portion of the cover glass so that air bubbles may not be generated between the cover glass and the decorative film. Further, the printing layer may cover the holes so that the holes of the decorative film may not be visible.

In the method of manufacturing the window for the display device in the embodiments, the decorative film may be attached to the cover glass such that the plurality of holes of the decorative film overlap the curved portion of the cover glass, so that the decorative film may be attached to the cover glass having the curved portion without detachment.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, windows for display devices and methods of manufacturing windows for display devices in embodiments will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, a display device including a window for the display device in embodiments will be described with reference to FIGS. 1 and 2.

Figure 1:
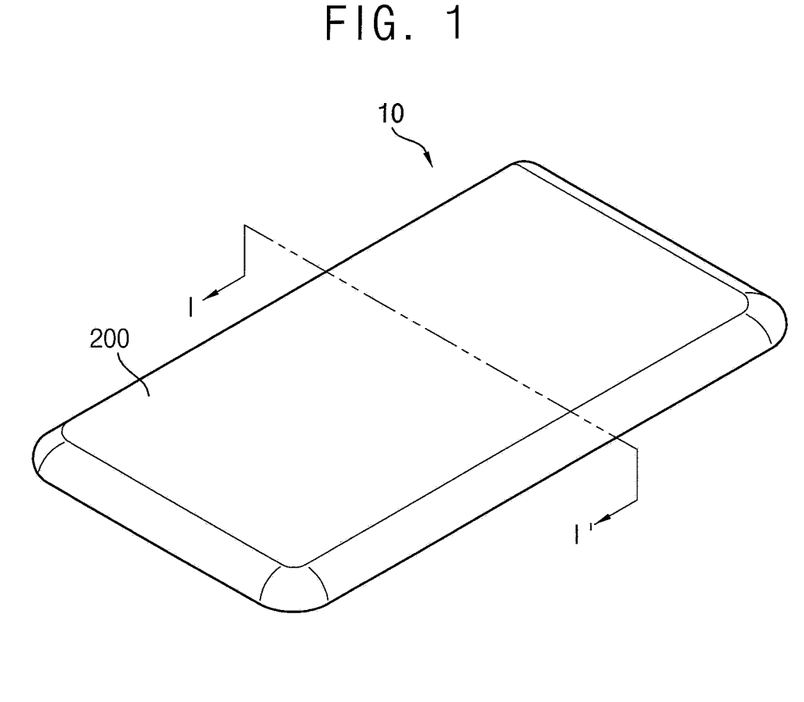
FIG. 1 is a perspective view illustrating an embodiment of a display device.

FIG. 1 is a perspective view illustrating an embodiment of a display device. FIG. 2 is a cross-sectional view taken along line I-I' in FIG. 1.

Figure 2:
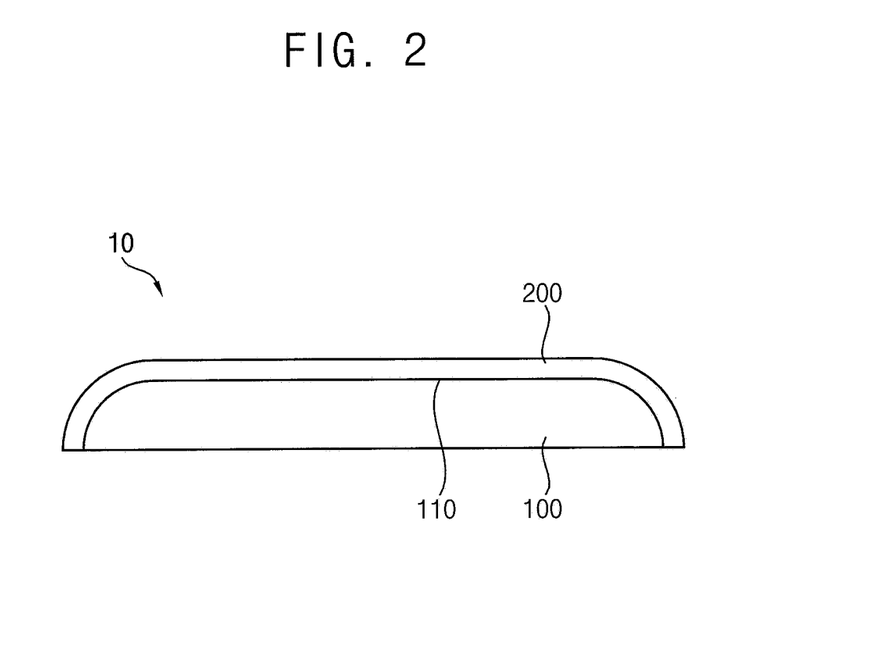
FIG. 2 is a cross-sectional view taken along line I-I' in FIG. 1.

Referring to FIGS. 1 and 2, a display device 10 in an embodiment may include a display panel 100 and a window 200 disposed on the display panel 100.

The display panel 100 may display an image. The display panel 100 may include at least one display surface 110, and may display the image through the display surface 110. In an embodiment, the display panel 100 may include various types such as an organic light emitting display panel, a liquid crystal display panel, a plasma display panel, or the like.

The window 200 may be disposed on the display surface 110 of the display panel 100. The image displayed from the display surface 110 of the display panel 100 may be provided to outside through the window 200. In an embodiment, an input sensing layer, a polarizing layer, an adhesive layer, or the like may be disposed between the display panel 100 and the window 200.

The window 200 may include a flat portion and a curved portion. In an embodiment, a center portion of the window 200 may be flat, and an edge of the window 200 may be bent toward the display panel 100. In an embodiment, a first edge of the window 200 and a second edge of the window 200 opposite to the first edge with reference to the center portion of the window 200 may be bent toward the display panel 100 with the same curvature as each other or different curvatures from each other, for example.

Hereinafter, a window 200 for a display device in embodiments will be described with reference to FIGS. 3 to 10.

Figure 3:
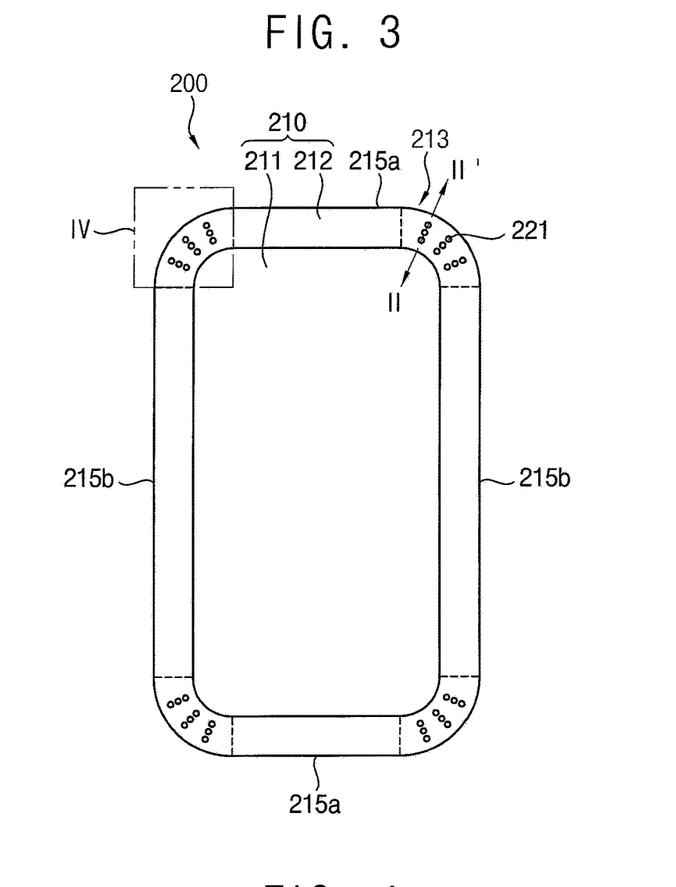
FIG. 3 is a plan view illustrating an embodiment of a window for a display device.
Figure 4:
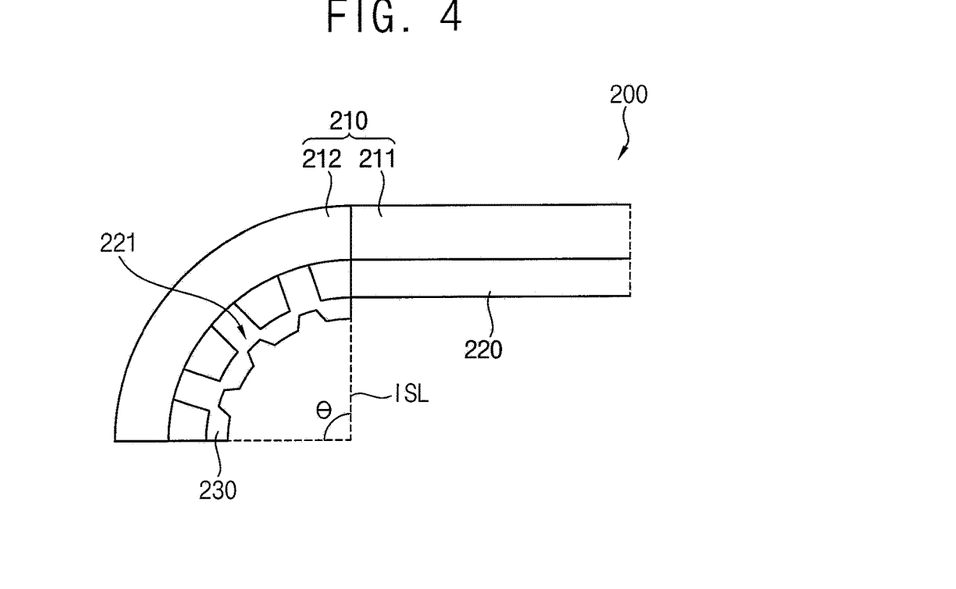
FIG. 4 is cross-sectional view illustrating an embodiment of a window for a display device.

FIG. 3 is a plan view illustrating an embodiment of a window for a display device. FIG. 4 is cross-sectional view illustrating an embodiment of a window for a display device. In an embodiment, FIG. 4 may be a cross-sectional view taken along line II-II' in FIG. 3, for example.

Referring to FIGS. 3 and 4, a window 200 in an embodiment may include a cover glass 210, a decorative film 220, and a printing layer 230.

The cover glass 210 may include a flat portion 211 and a curved portion 212 adjacent to the flat portion 211. The curved portion 212 may be bent in one direction from the flat portion 211. In an embodiment, the curved portion 212 may be positioned at an edge of the flat portion 211, and may surround the flat portion 211. In an embodiment, the flat portion 211 may have a substantially quadrangular (e.g., rectangular) shape in a plan view, and the curved portion 212 may have a substantially quadrangular (e.g., rectangular) frame shape in a plan view, for example.

The decorative film 220 may be disposed on the cover glass 210. In an embodiment, the decorative film 220 may be disposed on a lower surface of the cover glass 210, for example. The decorative film 220 may serve to define a display area of the cover glass 210, therefore, the decorative film 220 may expose the display area of the cover glass 210, and may cover a non-display area of the cover glass 210. The decorative film 220 may serve to prevent reflection of external light, therefore, the decorative film 220 may provide excellent visibility to a user. Various designs may be provided in the decorative film 220 so that the decorative film 220 may provide excellent aesthetic impression to the user.

The decorative film 220 may have a multilayer structure including a plurality of layers. In an embodiment, the decorative film 220 may include the multilayer structure in which a base layer, an adhesive layer, a patterned layer, a coating layer, or the like are stacked. In an embodiment, the base layer may include transparent material such as polyethylene terephthalate ("PET") or the like. In an embodiment, the adhesive layer may attach the decorative film 220 to the cover glass 210, and may include transparent adhesive such as an optically clear adhesive ("OCA") or the like. The patterned layer may be disposed in the non-display area of the cover glass 210 to provide aesthetic impression of the display device, and may include ultraviolet curing material such as urethane based material or the like. In an embodiment, the coating layer may be disposed in the non-display area of the cover glass 210 to provide aesthetic impression of the display device together with the patterned layer, and may include metal such as titanium oxide ($TiO_2$), indium (In), aluminum oxide ($Al_2O_3$), aluminum (Al), or the like.

The decorative film 220 before being attached to the cover glass 210 may have a two-dimensional shape, however, the cover glass 210 may have a three-dimensional shape in which an edge of the cover glass 210 is bent. Therefore, a portion of the decorative film 220 may be compressed and another portion of the decorative film 220 may be stretched when the decorative film 220 is attached to the cover glass 210. Accordingly, the decorative film 220 attached to the cover glass 210 may be detached from the cover glass 210, and air bubbles may be generated between the cover glass 210 and the decorative film 220.

To prevent the detachment of the decorative film 220 and the generation of the air bubbles between the cover glass 210 and the decorative film 220, a plurality of holes 221 overlapping the curved portion 212 of the cover glass 210 may be defined in the decorative film 220. The air bubbles generated between the cover glass 210 and the decorative film 220 may be released through the holes 221 of the decorative film 220 when the decorative film 220 is attached to the cover glass 210. Accordingly, the detachment of the decorative film 220 from the cover glass 210 may be prevented.

In an embodiment, the curved portion 212 of the cover glass 210 may be positioned at one or more corners 213 of the cover glass 210, and the holes 221 of the decorative film 220 overlapping the curved portion 212 may overlap one or more corners 213 of the cover glass 210. In an embodiment, the holes 221 of the decorative film 220 may overlap four corners of the cover glass 210, for example.

In an embodiment, the curved portion 212 of the cover glass 210 may have multiple curvatures. In the specification, the multiple curvatures mean that curvatures vary depending on positions. That is, the structure having the multiple curvatures is a structure in which multiple curvatures are included in one curved surface, and curvatures in the curved surface are not the same and are varied. In an embodiment, when the curved portion 212 of the cover glass 210 is positioned at the corner 213 of the cover glass 210, because the corner 213 is positioned between a first side 215a bent along a first bending axis extending in a first direction (e.g., horizontal direction in FIG. 3) and a second side 215b bent along a second bending axis extending in a second direction (e.g., vertical direction in FIG. 3) perpendicular to the first direction, the curved portion 212 of the cover glass 210 may have the multiple curvatures, for example. The decorative film 220 may not be easily attached to the curved portion 212 of the cover glass 210 without detachment when the curved portion 212 of the cover glass 210 is bent with having the multiple curvatures. However, the air bubbles generated between the cover glass 210 and the decorative film 220 may be released through the holes 221 of the decorative film 220 because the holes 221 overlapping the curved portion 212 of the cover glass 210 are defined in the decorative film 220, and the decorative film 220 may be attached to the cover glass 210 without detachment.

The printing layer 230 may be disposed on the decorative film 220. In an embodiment, the printing layer 230 may be disposed on a lower surface of the decorative film 220, for example. The printing layer 230 may cover the holes 221 of the decorative film 220. The holes 221 of the decorative film 220 may be exposed through the cover glass 210 when the printing layer 230 is not provided, therefore, the holes 221 of the decorative film 220 may be recognized by a user. However, the printing layer 230 covering the holes 221 of the decorative film 220 may be provided, so that recognition of the holes 221 of the decorative film 220 may be prevented, and the printing layer 230 may provide excellent aesthetic impression to the user.

In an embodiment, a color of the printing layer 230 may be substantially the same as a color of the decorative film 220. In an embodiment, the printing layer 230 may include an ink having a color substantially the same as the color of the decorative film 220, for example. Accordingly, the decorative film 220 and the printing layer 230 covering the holes 221 of the decorative film 220 may not be visually distinguished.

In an embodiment, the printing layer 230 may fill the holes 221 of the decorative film 220. In other words, a thickness of the printing layer 230 inside the holes 221 of the decorative film 220 may be greater than a thickness of the decorative film 220.

Figure 5:
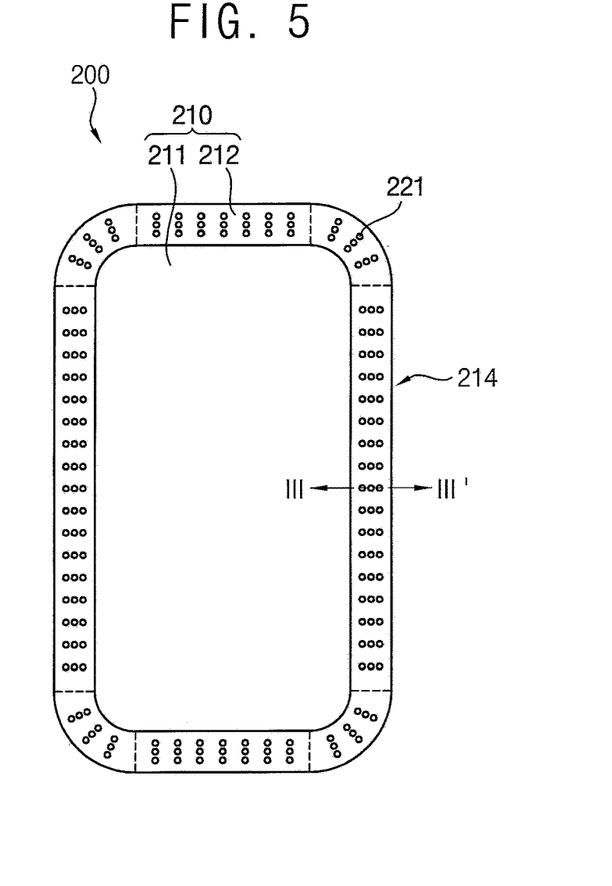
FIG. 5 is a plan view illustrating an embodiment of a window for a display device.

FIG. 5 is a plan view illustrating an embodiment of a window for a display device. In an embodiment, FIG. 4 may be a cross-sectional view taken along line in FIG. 5, for example.

Referring to FIGS. 4 and 5, in an embodiment, the curved portion 212 of the cover glass 210 may be positioned at an edge 214 of the cover glass 210, and the holes 221 of the decorative film 220 overlapping the curved portion 212 may overlap the edge 214 of the cover glass 210. In an embodiment, the holes 221 of the decorative film 220 may overlap four side portions of the cover glass 210 and four corners positioned between the side portions, for example.

In an embodiment, a bent angle θ of the curved portion 212 of the cover glass 210 may be equal to or greater than about 70 degrees. In other words, an angle θ defined between an end of the curved portion 212 of the cover glass 210 with respect to an imaginary straight line ISL perpendicular to the flat portion 211 of the cover glass 210 may be equal to or greater than about 70 degrees as illustrated in FIG. 4. The decorative film 220 may not be easily attached to the curved portion 212 of the cover glass 210 without detachment when the bent angle θ of the curved portion 212 of the cover glass 210 is equal to or greater than about 70 degrees. However, the air bubbles generated between the cover glass 210 and the decorative film 220 may be released through the holes 221 of the decorative film 220 because the holes 221 overlapping the curved portion 212 of the cover glass 210 are defined in the decorative film 220, and the decorative film 220 may be attached to the cover glass 210 without detachment.

Figure 6:
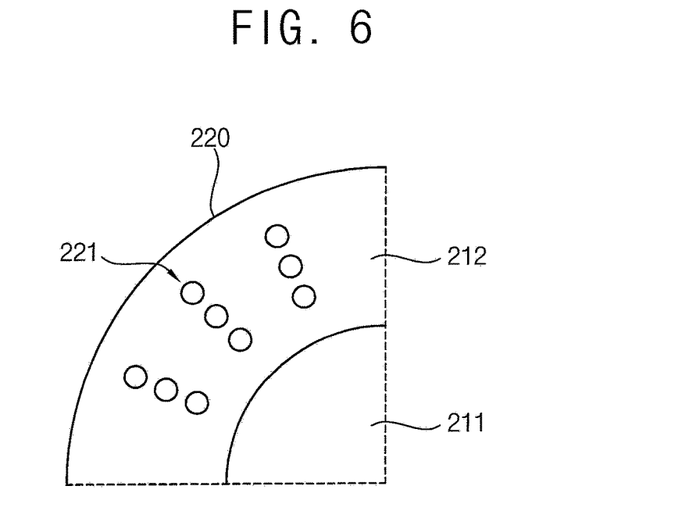
FIGS. 6, 7, and 8 are plan views illustrating embodiments of a portion of a window for a display device.
Figure 7:
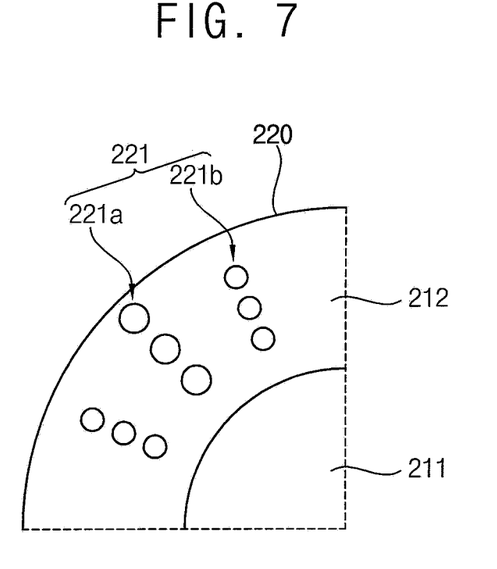
Figure 8:
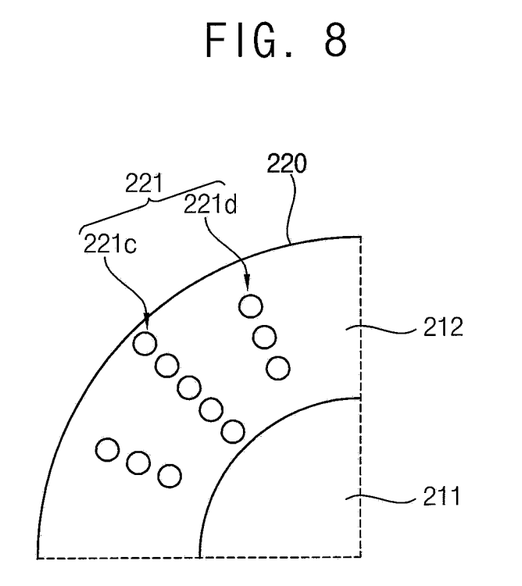

FIGS. 6, 7, and 8 are plan views illustrating embodiments of a portion of a window for a display device. In an embodiment, FIGS. 6, 7, and 8 may illustrate an area IV in FIG. 3.

Referring to FIGS. 3 and 6, in an embodiment, each of the holes 221 of the decorative film 220 may have a circular shape in a plan view. In an embodiment, a diameter of each of the holes 221 of the decorative film 220 may be about 1 millimeter (mm), for example. However, the invention is not limited thereto, and in another embodiment, each of the holes 221 of the decorative film 220 may have various shapes such as an oval shape, a polygonal shape, or the like in a plan view.

In an embodiment, sizes of the holes 221 of the decorative film 220 may be substantially equal to each other. In an embodiment, planar areas of the holes 221 of the decorative film 220 may be substantially equal to each other, for example. Specifically, the sizes of the holes 221 of the decorative film 220 may be substantially equal to each other regardless of distances from the first side 215a or the second side 215b of the cover glass 210 in a plan view.

In an embodiment, distribution densities of the holes 221 of the decorative film 220 may be substantially uniform. Specifically, the distribution densities of the holes 221 of the decorative film 220 may be substantially uniform regardless of distances from the first side 215a or the second side 215b of the cover glass 210 in a plan view. In other words, a gap between adjacent holes 221 among the holes 221 of the decorative film 220 may be substantially uniform, and the gap between the adjacent holes 221 may be substantially equal to each other regardless of distances from the first side 215a or the second side 215b of the cover glass 210 in a plan view.

Referring to FIGS. 3 and 7, in another embodiment, sizes of the holes 221 of the decorative film 220 may be different from each other. In an embodiment, planar areas of the holes 221 of the decorative film 220 may be different from each other, for example. Specifically, the sizes of the holes 221 of the decorative film 220 may be different from each other according to distances from the first side 215a or the second side 215b of the cover glass 210 in a plan view. In an embodiment, sizes of the holes 221a of the decorative film 220 relatively far from the first side 215a or the second side 215b of the cover glass 210 in a plan view may be greater than sizes of the holes 221b of the decorative film 220 relatively close to the first side 215a or the second side 215b of the cover glass 210 in a plan view, for example.

When the decorative film 220 is attached to the curved portion 212 of the cover glass 210, degrees of detachment of the decorative film 220 from the cover glass 210, in other words, the amount of air bubbles generated between the cover glass 210 and the decorative film 220 may be different according to positions in the curved portion 212 of the cover glass 210 in a plan view. In an embodiment, in the curved portion 212 positioned at the corner 213 of the cover glass 210, the amount of air bubbles generated at a portion relatively far from the first side 215a or the second side 215b of the cover glass 210 in a plan view may be greater than the amount of air bubbles generated at a portion relatively close to the first side 215a or the second side 215b of the cover glass 210 in a plan view, for example. As the sizes of the holes 221 of the decorative film 220 increase, the amount of air bubbles discharged through the holes 221 may increase. Accordingly, when the sizes of the holes 221a of the decorative film 220 relatively far from the first side 215a or the second side 215b of the cover glass 210 in a plan view are greater than the sizes of the holes 221b of the decorative film 220 relatively close to the first side 215a or the second side 215b of the cover glass 210 in a plan view, because the sizes of the holes 221 of the decorative film 220 are proportional to the amount of air bubbles, the air bubbles generated when attaching the decorative film 220 to the cover glass 210 may be more easily removed through the holes 221 of the decorative film 220.

Referring to FIGS. 3 and 8, in another embodiment, distribution densities of the holes 221 of the decorative film 220 may be non-uniform. Specifically, the distribution densities of the holes 221 of the decorative film 220 may be different according to distances from the first side 215a or the second side 215b of the cover glass 210 in a plan view. In an embodiment, the distribution densities of the holes 221c of the decorative film 220 relatively far from the first side 215a or the second side 215b of the cover glass 210 in a plan view may be greater than the distribution densities of the holes 221d of the decorative film 220 relatively close to the first side 215a or the second side 215b of the cover glass 210 in a plan view, for example. In other words, a gap between adjacent holes 221 among the holes 221 of the decorative film 220 may be non-uniform, and the gap between the adjacent holes 221 may be different from each other according to distances from the first side 215a or the second side 215b of the cover glass 210 in a plan view. In an embodiment, a gap between adjacent holes 221c relatively far from the first side 215a or the second side 215b of the cover glass 210 in a plan view may be less than a gap between adjacent holes 221d relatively close to the first side 215a or the second side 215b of the cover glass 210 in a plan view, for example.

As the distribution densities of the holes 221 of the decorative film 220 increase, the amount of air bubbles discharged through the holes 221 may increase. Accordingly, when the distribution densities of the holes 221c of the decorative film 220 relatively far from the first side 215a or the second side 215b of the cover glass 210 in a plan view are greater than the distribution densities of the holes 221d of the decorative film 220 relatively close to the first side 215a or the second side 215b of the cover glass 210 in a plan view, because the distribution densities of the holes 221 of the decorative film 220 are proportional to the amount of air bubbles, the air bubbles generated when attaching the decorative film 220 to the cover glass 210 may be more easily removed through the holes 221 of the decorative film 220.

Figure 9:
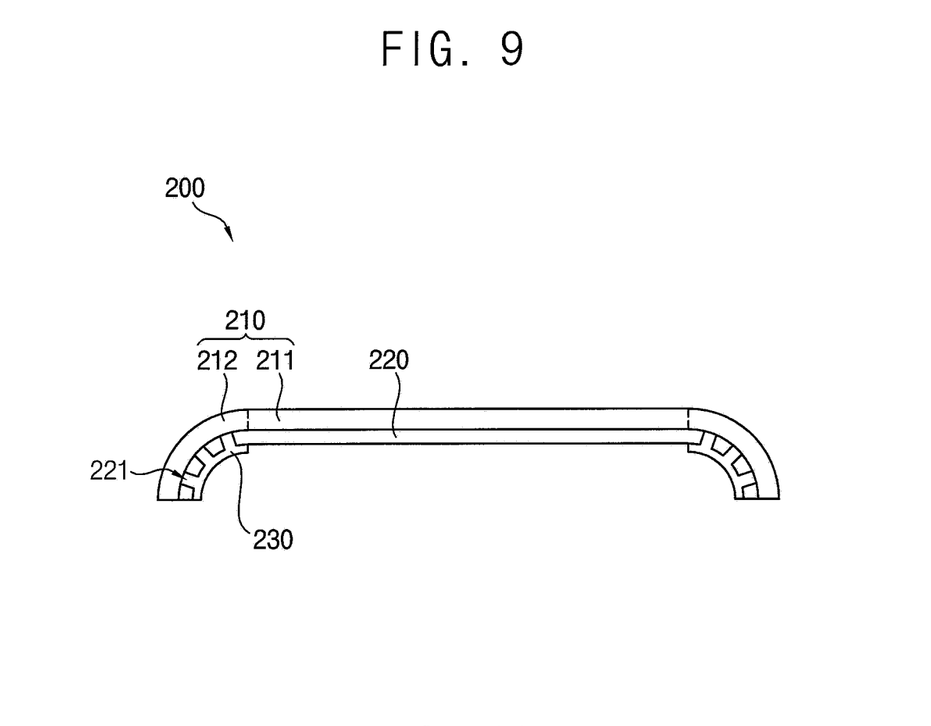
FIGS. 9 and 10 are cross-sectional views illustrating embodiments of a window for a display device.
Figure 10:
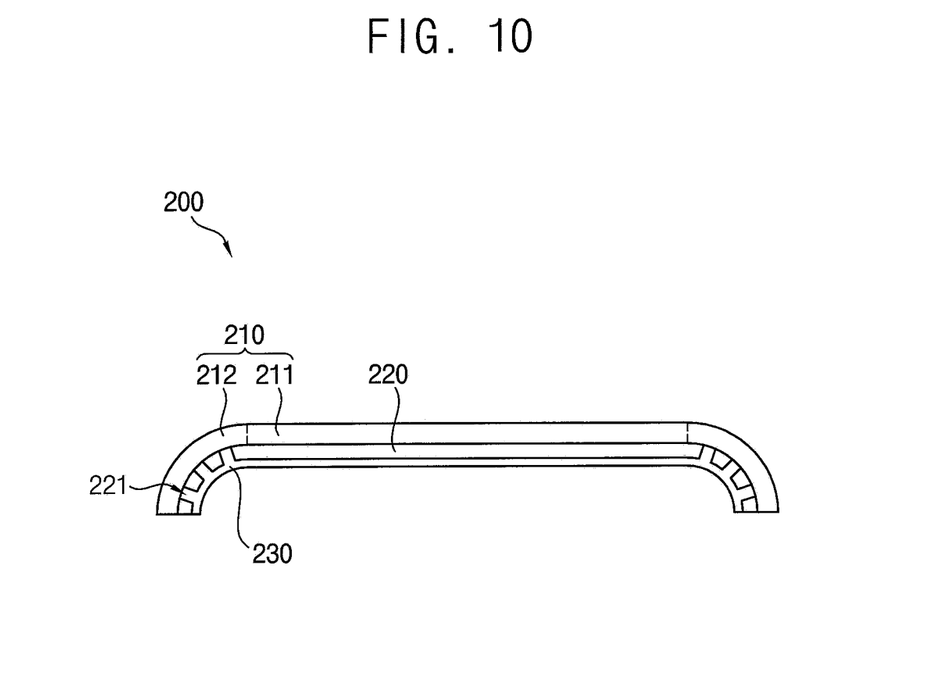

FIGS. 9 and 10 are cross-sectional views illustrating embodiments of a window for a display device.

Referring to FIG. 9, in an embodiment, the printing layer 230 may overlap the curved portion 212 of the cover glass 210, and may not overlap the flat portion 211 of the cover glass 210. In an embodiment, the printing layer 230 may overlap only a portion in which the holes 221 of the decorative film 220 are defined, and may not overlap another portion in which the holes 221 of the decorative film 220 are not defined, for example.

Referring to FIG. 10, in another embodiment, the printing layer 230 may overlap the curved portion 212 and the flat portion 211 of the cover glass 210. In an embodiment, the printing layer 230 may entirely cover the decorative film 220 regardless of a portion in which the holes 221 of the decorative film 220 are defined, for example.

Hereinafter, a method of manufacturing a window for a display device in embodiments will be described with reference to FIGS. 11 to 14.

FIGS. 11, 12, 13, and 14 are diagrams illustrating an embodiment of a method of manufacturing a window for a display device.

Figure 11:
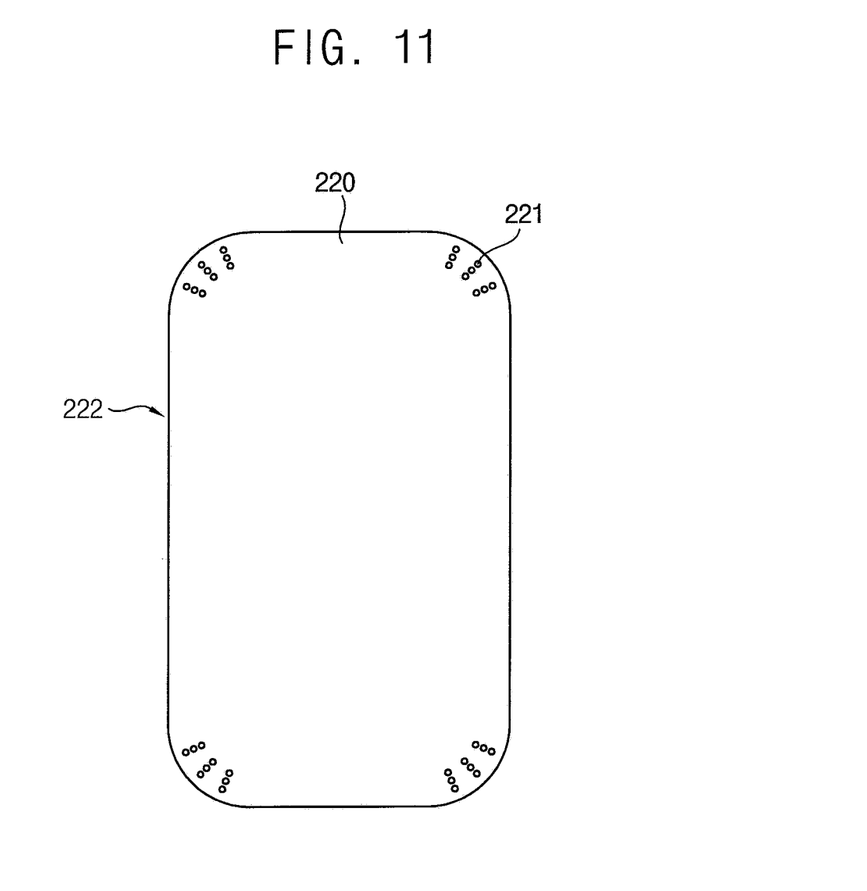
FIGS. 11, 12, 13, and 14 are diagrams illustrating an embodiment of a method of manufacturing a window for a display device.
Figure 12:
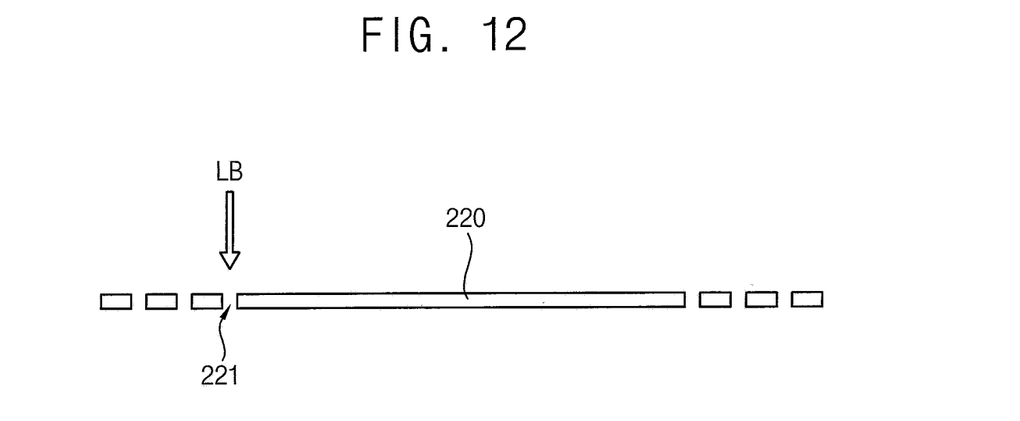

Referring to FIGS. 11 and 12, the plurality of holes 221 may be defined in the decorative film 220. In an embodiment, a laser beam LB may be irradiated at the edge and/or the corner of the decorative film 220 to define the holes 221, for example.

In an embodiment, the holes 221 of the decorative film 220 may be defined by a laser cutting. In an embodiment, a gas laser, such as a carbon dioxide laser, an excimer laser, a helium-neon (He—Ne) laser, etc., or a solid-state laser, such as a ruby laser, a glass laser, a yttrium aluminum garnet ("YAG") laser, a yttrium lithium fluoride ("YLF"), etc., may be used.

In an embodiment, the holes 221 of the decorative film 220 may be substantially simultaneously defined with a cutting of an outer surface 222 of the decorative film 220. In an embodiment, the outer surface 222 of the decorative film 220 defining a planar shape of the decorative film 220 may be provided by a laser cutting, and thus, the holes 221 of the decorative film 220 may be defined by the laser cutting together with the cutting of the outer surface 222 of the decorative film 220, for example. In such an embodiment, since the additional laser cutting process for defining the holes 221 of the decorative film 220 may not be desired, manufacturing cost and time of the window 200 may be reduced.

Figure 13:
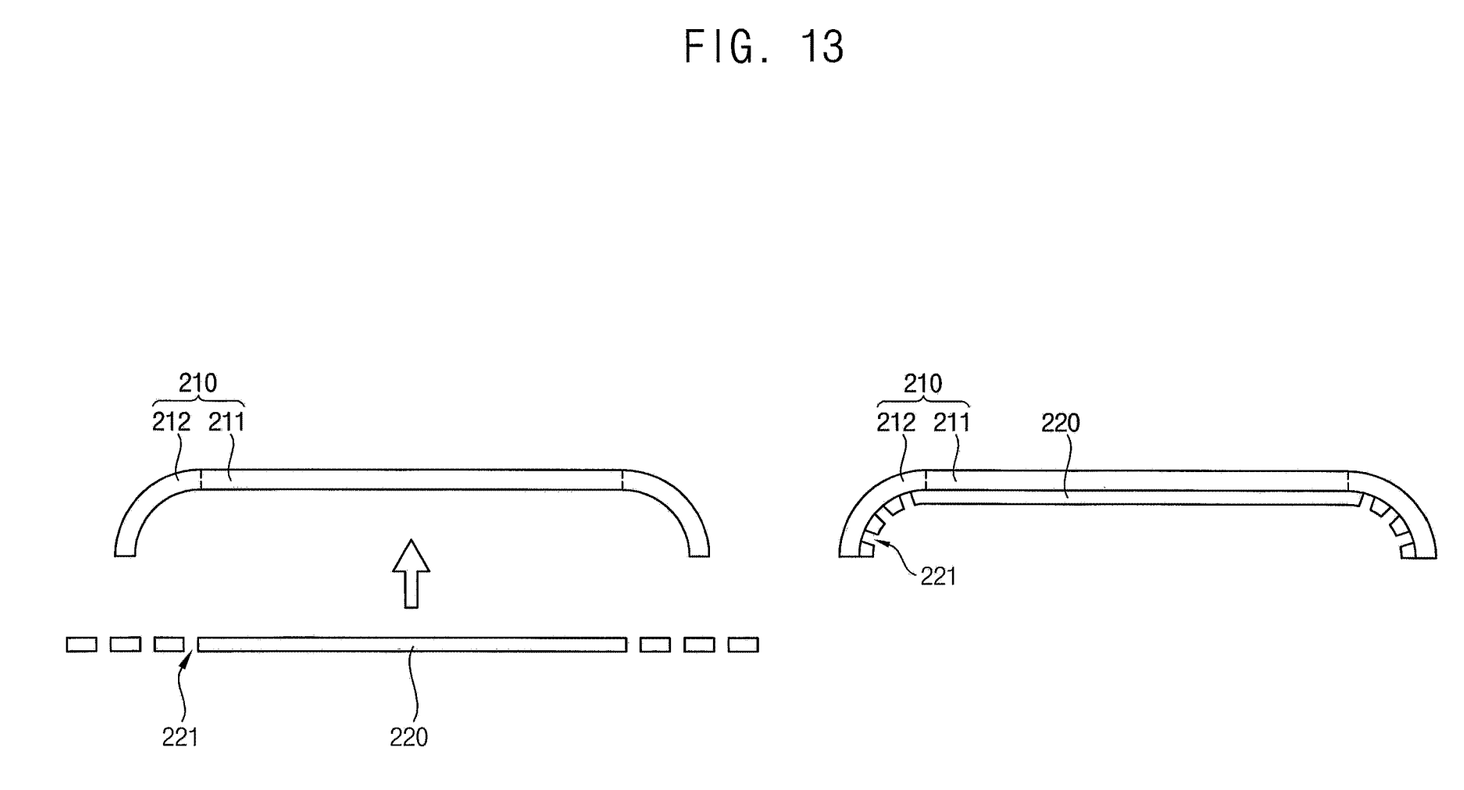

Referring to FIG. 13, the decorative film 220 may be attached on the cover glass 210 including the flat portion 211 and the curved portion 212. The decorative film 220 may be attached to the cover glass 210 such that the holes 221 overlap the curved portion 212 of the cover glass 210.

In an embodiment, a pad may be used to attach the decorative film 220 to a lower surface of the cover glass 210. After the cover glass 210 is positioned above the pad, and the decorative film 220 is positioned between the pad and the cover glass 210, the pad may press the decorative film 220 toward the cover glass 210 to attach the decorative film 220 to the lower surface of the cover glass 210. In such an embodiment, the decorative film 220 may be sequentially attached to the cover glass 210 from a center toward an edge.

The decorative film 220 before being attached to the cover glass 210 may have a two-dimensional shape, however, the cover glass 210 may have a three-dimensional shape including the flat portion 211 and the curved portion 212. Accordingly, the decorative film 220 may be detached from the cover glass 210 when the decorative film 220 is attached to the cover glass 210, and air bubbles may be generated between the cover glass 210 and the decorative film 220. However, the holes 221 overlapping the curved portion 212 of the cover glass 210 may be defined in the decorative film 220. Therefore, the air bubbles generated between the cover glass 210 and the decorative film 220 may be released through the holes 221 of the decorative film 220 when the decorative film 220 is attached to the cover glass 210. Accordingly, the decorative film 220 may not be detached from the cover glass 210.

In an embodiment, the air bubbles between the cover glass 210 and the decorative film 220 may be removed after attaching the decorative film 220 and before forming the printing layer. In an embodiment, the air bubbles between the cover glass 210 and the decorative film 220 may be removed in an autoclave, for example. Some air bubbles may remain between the cover glass 210 and the decorative film 220 although the holes 221 are defined in the decorative film 220. The cover glass 210 and the decorative film 220 may be pressed toward each other in the autoclave, and thus, the remaining air bubbles between the cover glass 210 and the decorative film 220 may be substantially completely removed.

Figure 14:
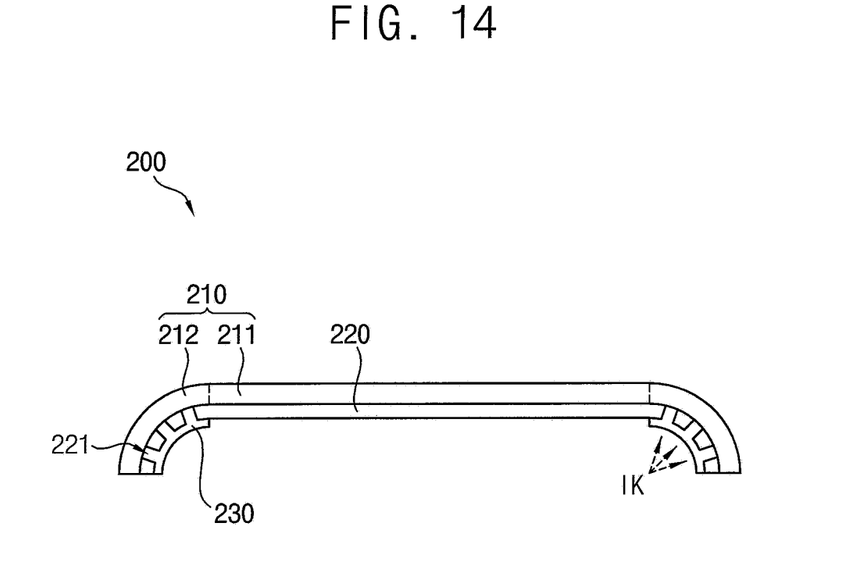

Referring to FIG. 14, the printing layer 230 covering the holes 221 may be disposed on the decorative film 220. In an embodiment, the printing layer 230 may be provided by a spray printing. In an embodiment, an ink IK having a color substantially the same as a color of the decorative film 220 may be sprayed on the holes 221 of the decorative film 220 to form the printing layer 230 having a color substantially the same as the color of the decorative film 220, for example. Accordingly, the decorative film 220 and the printing layer 230 covering the holes 221 of the decorative film 220 may not be visually differentiated.

Hereinafter, a display device including a window for a display device in embodiments will be described with reference to FIGS. 15 and 16.

Figure 15:
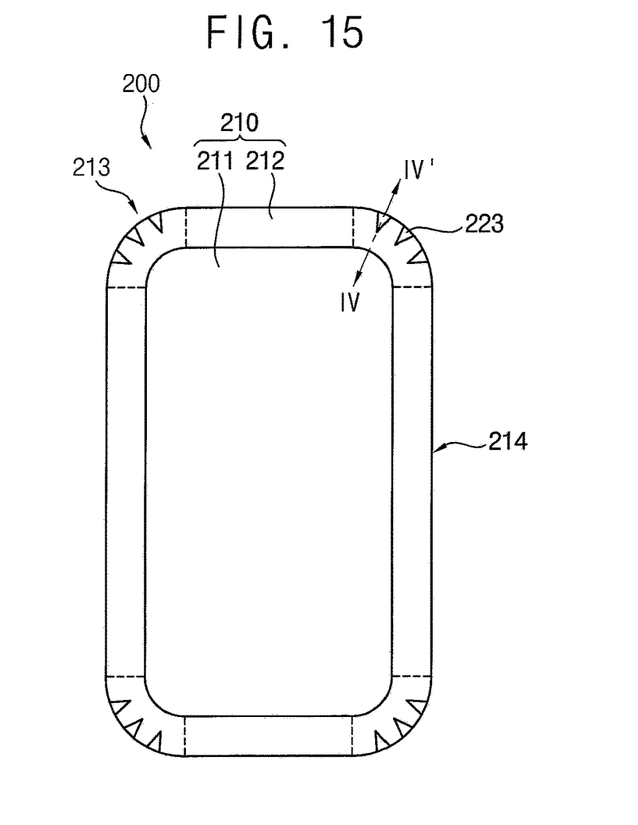
FIG. 15 is a plan view illustrating an embodiment of a window for a display device.

FIG. 15 is a plan view illustrating an embodiment of a window for a display device. FIG. 16 is a cross-sectional view taken along line IV-IV' in FIG. 15.

Figure 16:
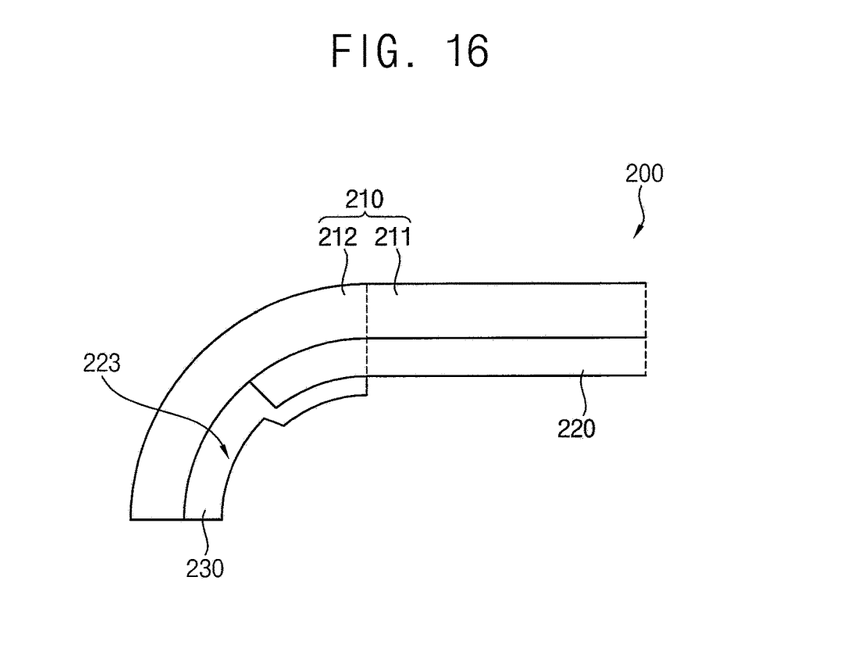
FIG. 16 is a cross-sectional view taken along line IV-IV' in FIG. 15.

Descriptions on elements of the window for the display device in an embodiment with reference to FIGS. 15 and 16, which are substantially the same as or similar to those of the window for the display device in an embodiment with reference to FIGS. 3 and 4, will not be repeated.

In an embodiment, a plurality of cut portions 223 overlapping the curved portion 212 of the cover glass 210 may be defined in the decorative film 220. The cut portions 223 of the decorative film 220 may be defined to correspond to the corner 213 and/or the edge 214 of the cover glass 210.

In an embodiment, the cut portions 223 of the decorative film 220 may be arranged along the corner 213 and/or the edge 214 of the cover glass 210, for example. The air bubbles generated between the cover glass 210 and the decorative film 220 may be released through the cut portions 223 of the decorative film 220 when the decorative film 220 is attached to the cover glass 210. Accordingly, the detachment of the decorative film 220 from the cover glass 210 may be prevented.

In an embodiment, each of the cut portions 223 of the decorative film 220 may have a sector shape in a plan view. In an embodiment, a circular arc of the cut portion 223 having the sector shape may overlap the corner 213 and/or the edge 214 of the cover glass 210, for example.

The printing layer 230 may be disposed on the decorative film 220. The printing layer 230 may cover the cut portions 223 of the decorative film 220. The printing layer 230 covering the cut portions 223 of the decorative film 220 may be provided, so that recognition of the cut portions 223 of the decorative film 220 may be prevented, and the printing layer 230 may provide excellent aesthetic impression to the user.

In an embodiment, the printing layer 230 may fill the cut portions 223 of the decorative film 220. In other words, a thickness of the printing layer 230 inside the cut portions 223 of the decorative film 220 may be greater than a thickness of the decorative film 220.

The window for the display device in the embodiments may be applied to a display device included in a computer, a notebook, a mobile phone, a smartphone, a smart pad, a portable media player ("PMP"), a portable digital assistance ("PDA"), an MP3 player, or the like.

Although the window for the display device and the method of manufacturing the window for the display device in the embodiments have been described with reference to the drawings, the illustrated embodiments are examples, and may be modified and changed by a person having ordinary knowledge in the relevant technical field without departing from the technical spirit.

What is claimed is:

1. A window for a display device, comprising:
   a cover glass including a flat portion and a curved portion adjacent to the flat portion;
   a decorative film which prevents reflection of external light and is disposed on the cover glass and in which a plurality of holes overlapping the curved portion is defined; and
   a printing layer disposed on the decorative film, covering the plurality of holes and having a thickness greater than a maximum thickness of the decorative film in a direction perpendicular to a main plane extension direction of the cover glass.

2. The window of claim 1, wherein the curved portion has multiple curvatures.

3. The window of claim 1, wherein a bent angle of the curved portion is equal to or greater than about 70 degrees with respect to an imaginary straight line perpendicular to the flat portion.

4. The window of claim 1, wherein the curved portion is positioned at a corner of the cover glass.

5. The window of claim 1, wherein the curved portion is positioned at an edge of the cover glass.

6. The window of claim 1, wherein each of the plurality of holes has a circular shape in a plan view.

7. The window of claim 6, wherein a diameter of each of the plurality of holes is about 1 millimeter.

8. The window of claim 1, wherein sizes of the plurality of holes are equal to each other.

9. The window of claim 1, wherein sizes of the plurality of holes are different from each other.

10. The window of claim 1, wherein a distance between adjacent holes among the plurality of holes is uniform.

11. The window of claim 1, wherein a distance between adjacent holes among the plurality of holes is non-uniform.

12. The window of claim 1, wherein the printing layer overlaps the curved portion and does not overlap the flat portion.

13. The window of claim 1, wherein the printing layer overlaps the curved portion and the flat portion.

14. The window of claim 1, wherein a color of the printing layer is a same as a color of the decorative film.

15. The window of claim 1, wherein the printing layer fills the plurality of holes.

16. A method of manufacturing a window for a display device, the method comprising:
   defining a plurality of holes in a decorative film;
   attaching the decorative film which prevents reflection of external light to a cover glass including a flat portion and a curved portion such that the plurality of holes overlaps the curved portion; and
   forming a printing layer covering the plurality of holes on the decorative film,
   wherein the printing layer has a thickness greater than a maximum thickness of the decorative film in a direction perpendicular to a main plane extension direction of the cover glass.

17. The method of claim 16, wherein the plurality of holes is defined by a laser cutting.

18. The method of claim 16, wherein the printing layer is formed by a spray printing.

19. The method of claim 16, further comprising:
   removing air bubbles between the cover glass and the decorative film after the attaching the decorative film and before the forming the printing layer.

20. The method of claim 19, wherein the air bubbles are removed in an autoclave.

* * * * *